(12) United States Patent
Imaizumi

(10) Patent No.: US 6,487,237 B1
(45) Date of Patent: Nov. 26, 2002

(54) SPREADING CODE ESTIMATING APPARATUS AND SPREADING CODE ESTIMATING METHOD

(75) Inventor: Satoshi Imaizumi, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/233,434

(22) Filed: Jan. 20, 1999

(30) Foreign Application Priority Data

Jan. 28, 1998 (JP) ............................................ 10-030635

(51) Int. Cl.$^7$ ................................................. H04K 1/00
(52) U.S. Cl. ......................... 375/149; 375/150; 370/342
(58) Field of Search ................................. 375/130, 140, 375/142, 143, 149, 150, 152, 147, 367, 316; 370/335, 342, 441, 320

(56) References Cited

U.S. PATENT DOCUMENTS

| | | | | |
|---|---|---|---|---|
| 5,353,352 A | * | 10/1994 | Dent et al. ...................... | 380/37 |
| 5,440,597 A | * | 8/1995 | Chung et al. .................. | 375/149 |
| 5,724,382 A | * | 3/1998 | Maruyama .................... | 375/141 |
| 5,764,686 A | * | 6/1998 | Sanderford et al. .......... | 375/149 |
| 5,848,160 A | * | 12/1998 | Cai et al. ....................... | 380/44 |
| 6,229,798 B1 | * | 5/2001 | Naruse ........................ | 370/342 |

FOREIGN PATENT DOCUMENTS

| | | |
|---|---|---|
| JP | 8-32547 | 2/1996 |
| JP | 9-18458 | 1/1997 |
| JP | 9-98110 | 4/1997 |

OTHER PUBLICATIONS

English Language Abstract of JP 8–32547.
English Language Abstract of JP 9–98110.
English Language Abstract of JP 9–18458.

* cited by examiner

*Primary Examiner*—Stephen Chin
*Assistant Examiner*—Chieh M. Fan
(74) *Attorney, Agent, or Firm*—Greenblum & Bernstein, P.L.C.

(57) ABSTRACT

A preliminary selection averaging section 105 averages a small number of correlation values, a candidate code selecting section 106 selects some spreading codes, each having a high average correlation value, as candidates of a real spreading code, an actual selection averaging section 107 performs the averaging the correlation values of the respective candidate codes by use of the number of correlation values necessary for sufficiently restraining noise, and a maximum value detecting section 108 estimates a spreading code, having a maximum correlation value, as a real spreading code. Thereby, time for an initial synchronization can be reduced without decreasing the accuracy of the spreading code estimation.

11 Claims, 7 Drawing Sheets

SPREADING CODE ESTIMATING APPARATUS AND SPREADING CODE ESTIMATING METHOD

BACKGROUND OF THE INVENTION

1. Field of the Invention

The present invention relates to a spreading code estimating apparatus and a spreading code estimating method in a radio communication system using a CDMA system.

2. Description of the Related Art

In the CDMA (Code Division Multiple Access), a signal of a wide band subjected to a secondary modulation using a spreading code is radio transmitted on a transmitter side. On a receiver side, a received signal is multiplied by the same spreading code as the transmitter side so as to obtain a signal of a narrow band.

In the radio communication system using the CDMA system, when a plurality of transmitting stations is present, each station transmits the signal using the spreading code peculiar to each station. For this reason, the receiver side must check the correlation between all spreading codes used in the system and the phases in connection with the received signal, and estimate the spreading code of the received signal and the phase thereof.

The following will explain the conventional spreading code estimating apparatus with reference to the block diagram shown in FIG. 1. In the explanation set forth below, the same spreading code as the spreading code by which the signal is multiplied on the transmitter side is referred to as "real spreading code." Then, the spreading code estimating apparatus aims to estimate the real spreading code from all spreading codes used in this system.

As shown in FIG. 1, the conventional spreading code estimating apparatus comprises a radio receiving section 1, a code number storing section 2, a spreading code generator 3, a correlation value computing section 4, an averaging section 5, and a maximum value detecting section 6. The radio receiving section 1 receives a signal of a radio frequency, and outputs a baseband signal. The code number storing section 2 stores numbers (hereinafter referred to as "code numbers") corresponding to all spreading codes and the phases used in the system. The spreading code generator 3 outputs a replica code corresponding to each code number. The correlation value computing section 4 computes a correlation value between the input baseband signal and the replica code. The averaging section 5 averages the number of correlation values necessary for sufficiently restraining noise. The maximum value detecting section 6 estimates the replica code having a maximum average correlation value as a real spreading code.

The signal of the radio frequency received from an antenna is modulated to a baseband signal by the radio receiving section 1, and is output to the correlation value computing section 4.

At the same time, a code number is output to the spreading code generator 3 from the code number storing section 3. Then, a replica code, corresponding to the code number, is output to the correlation value computing section 4 from the spreading code generator 3.

Next, the correlation value computing section 4 computes a correlation value between the baseband output from the radio receiving section 1 and the replica code output from the spreading code generator 3, and outputs the computed correlation value to the averaging section 5.

The correlation value is averaged by the averaging section 5 using the number of correlation values necessary for sufficiently restraining noise. Then, the average correlation value is output to the maximum value detecting section 6. The maximum value detecting section 6 detects the maximum value of the average correlation values of all spreading codes used in the system, and estimates the replica code corresponding to the maximum value as a real spreading code.

In the above-explained spreading code estimating apparatus, however, the following problem exists when the number of spreading codes to be estimated and that of phases are large.

More specifically, time for estimating the spreading codes increases in averaging the correlation values of all spreading codes using the number of correlation values necessary for sufficiently restraining noise.

SUMMARY OF THE INVENTION

An object of the present invention is to provide a spreading code estimating apparatus capable of shortening spreading code estimation time even if the number of spreading codes to be estimated and that of phases are large, and to provide a spreading code estimating method.

The object of the present invention can be attained by averaging correlation values smaller than the number of the correlation values necessary for sufficiently restraining noise so as to select spreading codes as candidates, and by averaging correlation values of the selected spreading codes using the number of correlation values necessary for sufficiently restraining noise so as to specify the spreading code.

DETAILED DESCRIPTION OF THE PREFERRED EMBODIMENTS

Embodiments of the present invention will be now described specifically with reference to the drawings.

In the explanation set forth below, the same spreading code as the spreading code by which the signal is multiplied on the transmitter side is referred to as "real spreading code." Then, the spreading code estimating apparatus aims to estimate the real spreading code from all spreading codes used in this system.

(First Embodiment)

Figure 1:
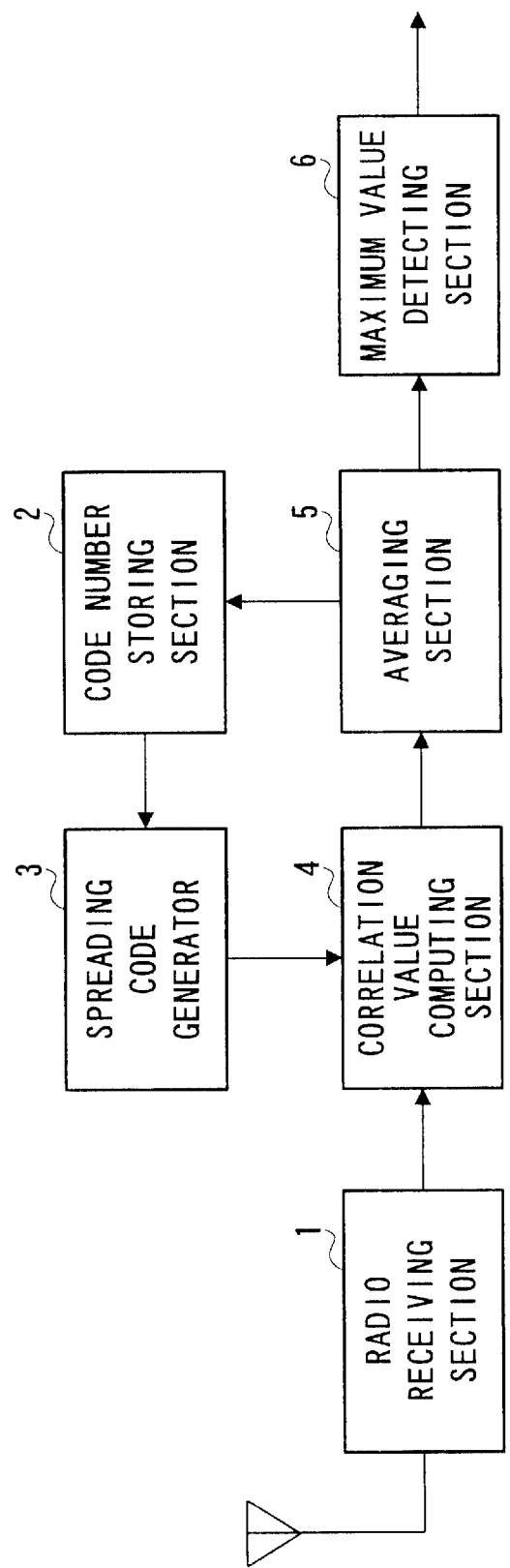
FIG. 1 is a block diagram showing the structure of the conventional spreading code estimating apparatus.
Figure 2:
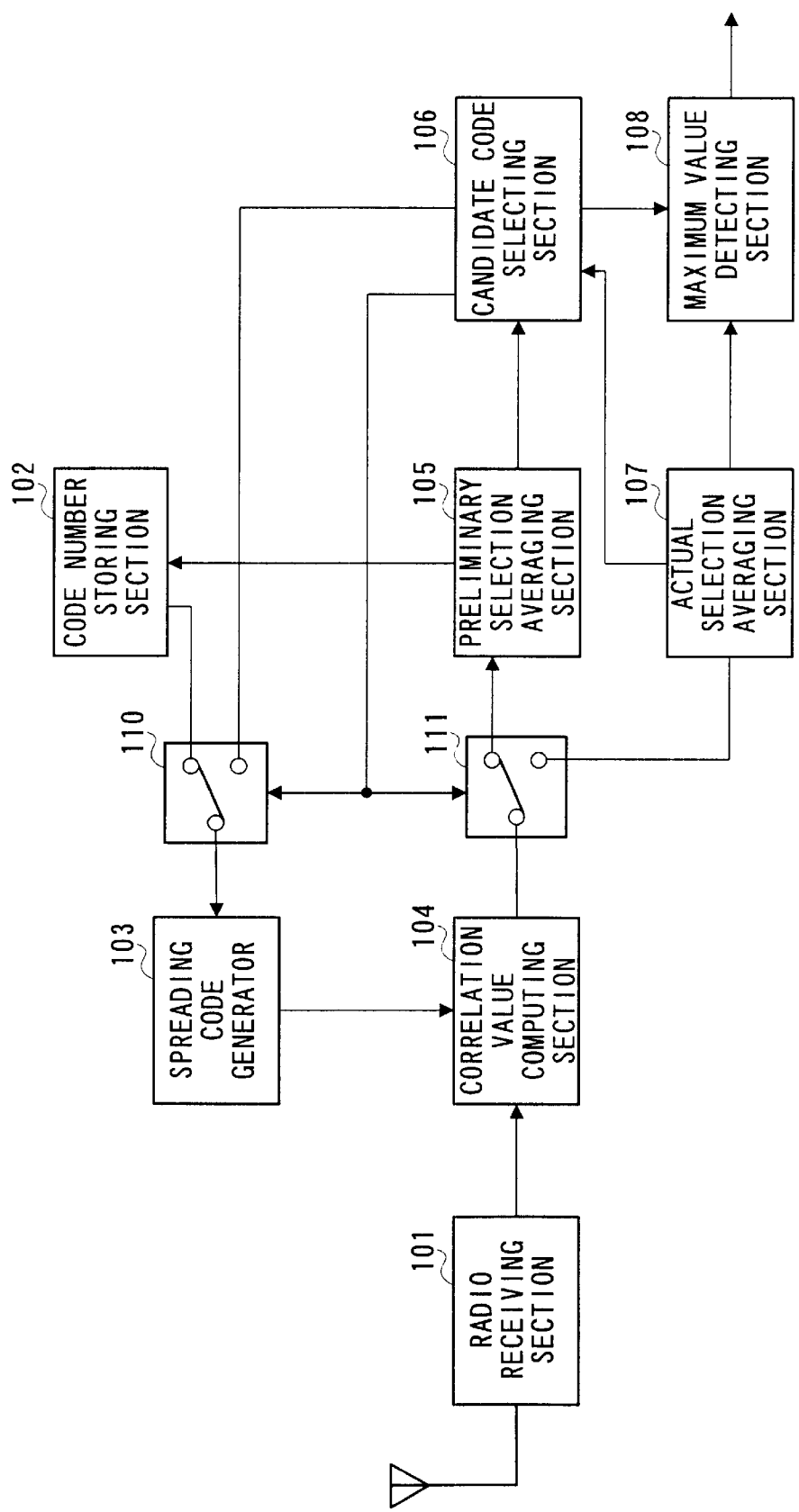
FIG. 2 is a block diagram showing the structure of the spreading code estimating apparatus according to a first embodiment of the present invention.

FIG. 2 is a block diagram showing the structure of the spreading code estimating apparatus according to a first embodiment of the present invention.

As shown in FIG. 2, the spreading code estimating apparatus of the first embodiment comprises a radio receiving section 101, a code number storing section 102, a spreading code generator 103, a correlation value computing section 104, a preliminary selection averaging section 105, and a candidate code selecting section 106, an actual selection averaging section 107, and a maximum value detecting section 108. The radio receiving section 101 receives the signal of a radio frequency, and outputs a baseband signal. The code number storing section 102 stores a spreading code number (hereinafter referred to as "code number") and a phase used in the system. The spreading code generator 103 outputs a replica code. The correlation value computing section 104 computes a correlation value. The preliminary selection averaging section 105 averages the correlation value preliminarily. The candidate code selecting section 106 selects a code number of a candidate of a real spreading code (hereinafter referred to as "candidate code"). The actual selection averaging section 107 performs the averaging of correlation values using the number of correlation values necessary for sufficiently restraining noise (hereinafter referred to as "noise restraint necessary number"). The maximum value detecting section 108 estimates the real spreading code from the averaged correlation value.

The spreading code estimating apparatus of the first embodiment further comprises a switching section 110 and a switching section 111. The switching section 110 inputs the code number output from the code number storing section 102 or the candidate code selecting section 106 to the spreading code generator 103. The switching section 111 inputs the correlation value output from the correlation value detecting section 104 to the preliminary selection averaging section 105 or the actual selection averaging section 107.

The radio receiving section 101 modulates the frequency of the radio frequency signal received by an antenna to the baseband so as to be output to the correlation value computing section 104.

The code number storing section 102 stores the code numbers corresponding to all spreading codes used in this system, and outputs the code numbers to the spreading code generator 103, sequentially.

The spreading code generator 103 outputs the replica code, corresponding to the code number input from the code number storing section 102 or the candidate code selecting section 106, to the correlation value computing section 104 based on timing of a transmission spreading code obtained in advance.

The correlation value computing section 104 computes a correlation value between the baseband signal input from the radio receiving section 101 and the replica code input from the spreading code generating means 103. Then, the correlation value computing section 104 outputs the correlation value to the preliminary selection averaging section 105 or the actual selection averaging section 107.

The preliminary selection averaging section 105 performs the averaging of the correlation value output from the correlation value computing section 104, and outputs the averaged correlation value to the candidate code selecting section 106. The preliminary selection averaging section 105 also outputs a timing signal to the code number storing section 102.

The candidate code selecting section 106 inputs the average correlation values of all spreading codes used in this system from the preliminary selection averaging section 105. Then, the candidate code selecting section 106 selects some replica codes having a high average correlation value as candidate codes (hereinafter referred to as "preliminary selection"). Thereafter, the candidate code selecting section 106 outputs the code numbers of the candidate codes to the spreading code generator 103 based on the timing signal sent from the actual selection averaging section 107.

As a method for selecting the candidate codes, there is a method in which only the number of replica codes predetermined in order of decreasing the average correlation value is selected. In this case, it is unnecessary to obtain an ordinal rank of the selected candidate codes. In other words, every time when the candidate code newly selected is input, the candidate code selecting section 106 compares the average correlation value of the newly selected candidate code with the lowest average correlation value of all spreading codes already stored as the candidates. Then, the candidate code selecting section 106 selects the higher average correlation value as the candidate code, and stores the code number.

Moreover, as another method for selecting the candidate codes, there is a method in which a threshold value is set in advance, and the average correlation value, which is higher than the threshold value, is selected from all replica codes. In this case, the number of candidate codes varies, depending on the state of a communication line. For this reason, in order to reserve the appropriate number of candidate codes, the threshold value must be set to be lower than an expected value of the correlation value, which is used in estimating the real spreading code.

The actual selection averaging section 107 performs the averaging of the correlation value output from the correlation value computing section 104 by use of the noise restraint necessary number. Then, the actual selection averaging section 107 outputs the averaged correlation value to the maximum value detecting section 108. Also, the actual selection averaging section 107 outputs the timing signal to the candidate code selecting section 106.

The maximum value detecting section 108 inputs the average correlation values of the respective candidate codes from the actual selection averaging section 107. Then, the maximum value detecting section 108 detects the maximum correlation value in the average correlation values, and estimates the corresponding candidate code as a real spreading code (hereinafter referred as "actual selection").

Next, an operation of the spreading code estimating apparatus of the first embodiment will be explained with reference to the flowchart of FIG. 3.

Figure 3:
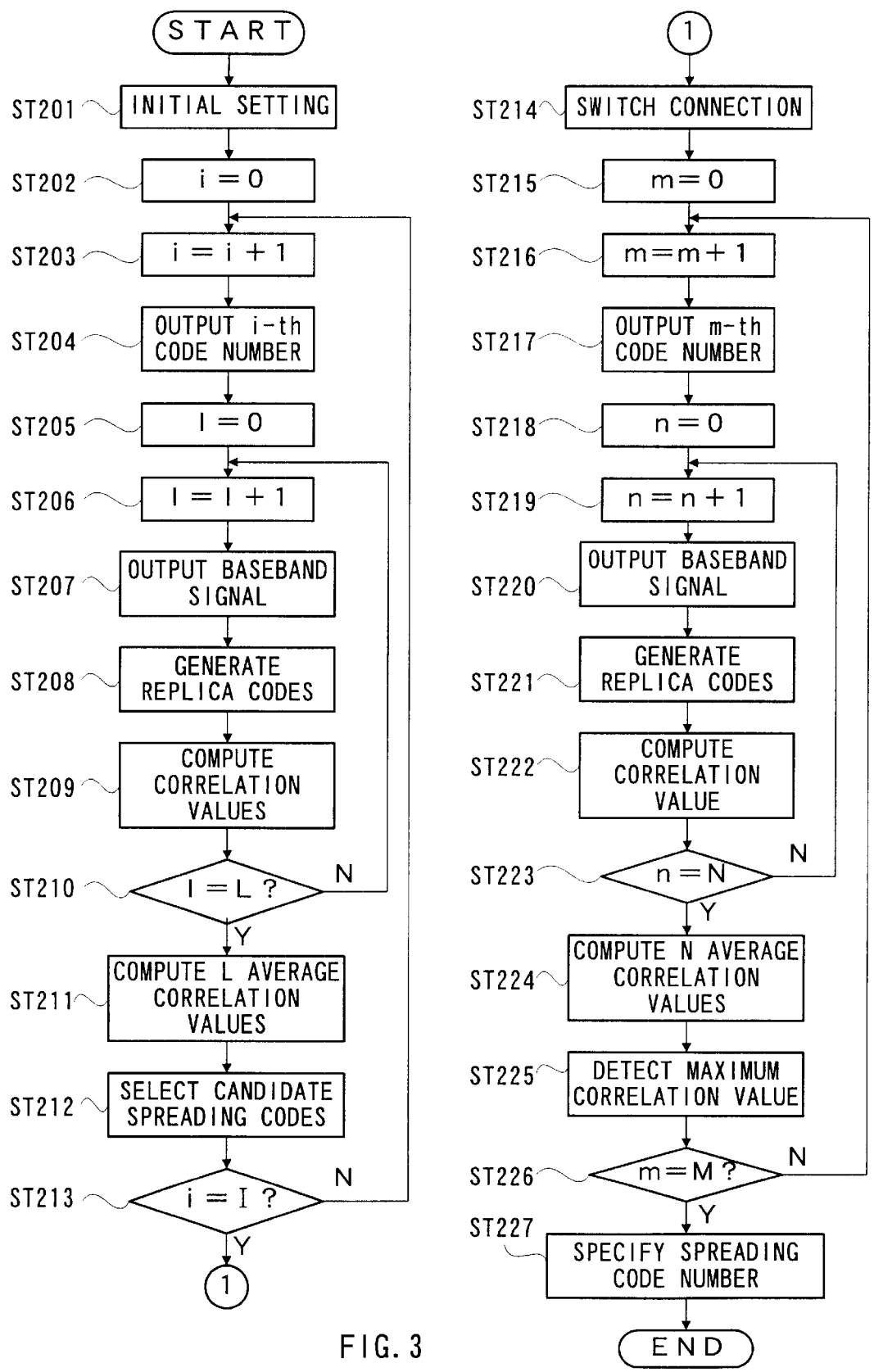
FIG. 3 is a flowchart showing an operation of the spreading code estimating apparatus according to the first embodiment of the present invention.

In FIG. 3, it should be noted that N is the noise restraint necessary number, and that L is the number of correlation values to be averaged at the time of the preliminary selection. In this case, L is smaller than the noise restraint necessary number. Also, I denotes the total number of spreading codes used in this system, and M means the number of spreading codes selected at the time of the preliminary selection.

First, in step (hereinafter referred to as "ST") 201, as an initial setting, a moving contact of the switching section 110 is connected to the code number storing section 102, and a moving contact of the switching section 111 is connected to the preliminary selection averaging section 105.

In ST202 to ST204, a first code number is output to the spreading code generator 103 from the code number storing section 102.

In ST 205 to ST 210, the radio receiving section 101 outputs the baseband signal to the correlation value computing section 104 at a predetermined timing. Then, the spreading code generator 103 outputs the replica code to the correlation value computing section 104, and the correlation value is computed by the correlation value computing section 104.

In ST 211, L correlation values computed by the correlation value computing section 104 are input to the preliminary selection averaging section 105. Then, L average correlation values are computed from L correlation values, and the computed L average correlation values are output to the candidate code selecting section 106.

In ST 212, the candidate selecting section 106 selects M candidate codes from I spreading codes based on L average correlation values, and their code numbers are stored.

It should be noted that the code number storing section 102 generates code numbers in a predetermined order. For this reason, it is unnecessary to send the code number to the candidate code selecting section 106 from an outer section as information.

Here, L, which is the number of correlation values to be averaged at the time of the preliminary selection, is smaller than the noise restraint necessary number. For this reason, in some cases, the average correlation value of the real spreading code does not achieve a maximum level. However, there is a high possibility that the real spreading code will be contained in the M candidate codes preliminarily selected.

Then, in ST 213, the preliminary selection (shown in ST 203 to ST 212) with respect to all spreading codes used in this system is ended, and the preliminarily selected candidate codes are subjected to the actual selection in the steps set forth below.

First of all, in ST 214, the moving contact of the switching section 110 is connected to the candidate code selecting section 106, and the moving contact of the switching section 111 is connected to the actual selection averaging section 107.

Next, in ST 215 to ST 217, the code numbers stored in the candidate code selecting section 106 are output to the spreading code generator 103 sequentially.

In ST 218 to ST 223, the radio receiving section 101 outputs the baseband signal to the correlation value computing section 104 at a predetermined timing. Then, the spreading code generator 103 outputs the replica code to the correlation value computing section 104, and the correlation value is computed by the correlation value computing section 104.

In ST 224, N correlation values computed by the correlation value computing section 104 are input to the actual averaging section 107. An N average correlation value is computed from the N correlation values. The N average correlation value is one that is obtained by averaging the correlation values of the noise restraint necessary number. It can be expected that a sufficient difference will occur in the correlation value between the real spreading code and each of the other candidate codes.

Next, in ST 225 to ST 227, the maximum value detecting section 108 detects the maximum value in the N average correlation values of all candidate codes, and the corresponding candidate code is estimated as the real spreading code.

Thus, the candidate codes are preliminarily selected by use of the average correlation values smaller than the number of the correlation values necessary for sufficiently restraining noise. Then, the selected spreading codes are averaged by use of the correlation values of the noise restraint necessary number. After that, the real spreading code is estimated from the maximum value of the average correlation values. As compared with the case in which all spreading codes are averaged by use of the correlation values corresponding to the noise restraint necessary number, the probability of success of estimating the spreading code can be maintained in the same degree. Moreover, spreading code estimation time can be largely reduced.

In the case in which all spreading codes are averaged by use of the correlation values corresponding to the noise restraint necessary number, the spreading code estimation time is ($N \times I$). In the present invention, the spreading code estimation time is ($L \times I + N \times M$). For example, it is assumed that $N=30$, $L=15$, $I=500$, and $M=20$. In this case, ($L \times I + N \times M$)/($N \times I$)=0.54, so that the spreading code estimation time can be reduced by 46%.

(Second Embodiment)

Figure 4:
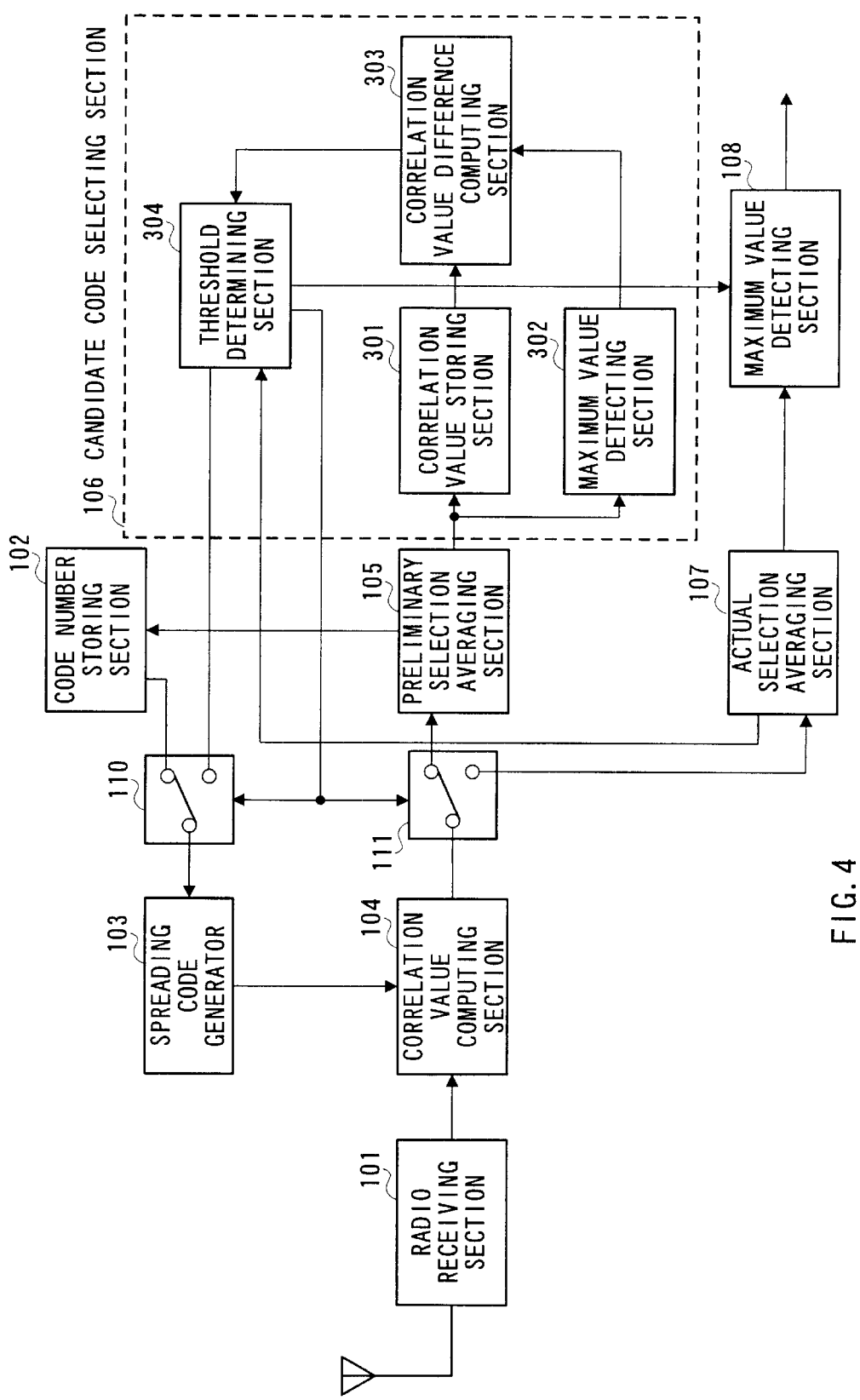
FIG. 4 is a block diagram showing the first structure of the spreading code estimating apparatus according to a second embodiment of the present invention.

FIG. 4 is a block diagram showing the structure of the spreading code estimating apparatus according to the second embodiment of the present invention. In the spreading code estimating apparatus of FIG. 4, the same reference numerals are added to the sections common to the spreading code estimating apparatus of FIG. 2, and the explanation will be omitted.

As shown in FIG. 4, the candidate code selecting section 106 of the spreading code estimating apparatus of the second embodiment comprises a correlation value storing section 301, a maximum value detecting section 302, a correlation value difference computing section 303, and a threshold determining section 304.

The correlation value storing section 301 stores an average correlation value output from the preliminary selection averaging section 105 during the preliminary selection. When the preliminary selection is ended, the correlation value storing section 301 outputs the stored average correlation value to the correlation value difference computing section 303.

The maximum value detecting section 302 detects a maximum correlation value from the average correlation values output from the preliminary selection averaging section 105. Then, the maximum value detecting section 302 outputs the detected maximum correlation value to the correlation value difference computing section 303.

The correlation value difference computing section 303 inputs the average correlation value output from the correlation value storing section 301, and inputs the maximum correlation value output from the maximum value detecting section 302. Then, the correlation value difference computing section 303 outputs a correlation value difference between each average correlation value and the maximum correlation value to the threshold determining section 304.

The threshold determining section 304 inputs the correlation difference output from the correlation value difference computing section 303. Then, the threshold determining section 304 outputs the code number of a candidate code, having a correlation value difference smaller than a predetermined threshold, to the spreading code generator 103.

Next, an operation of the spreading code estimating apparatus of the second embodiment will be explained with reference to the flowcharts of FIGS. 4 and 5.

Figure 5:
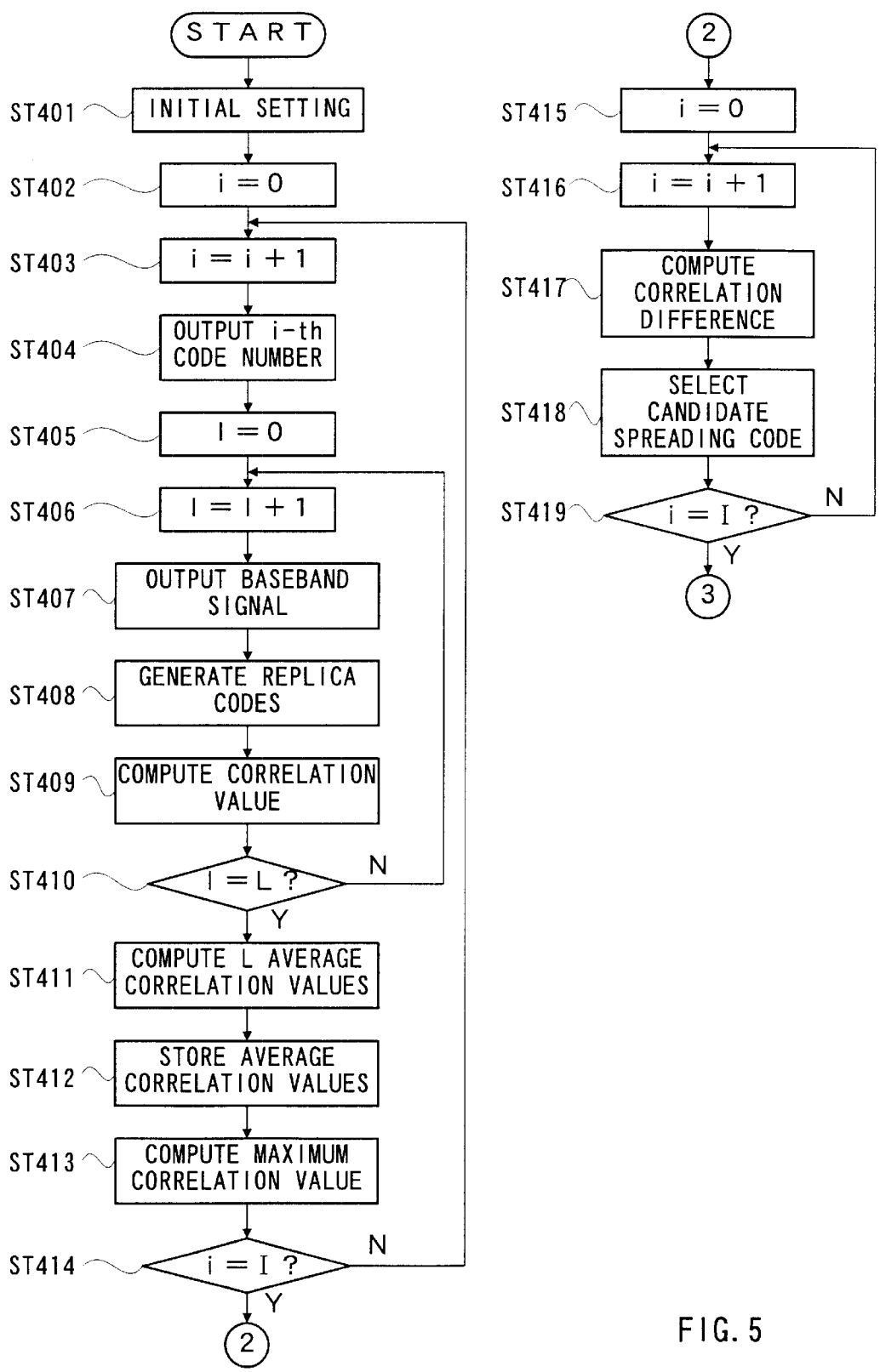
FIG. 5 is a flowchart showing a first half operation of the spreading code estimating apparatus according to the second embodiment of the present invention.
Figure 6:
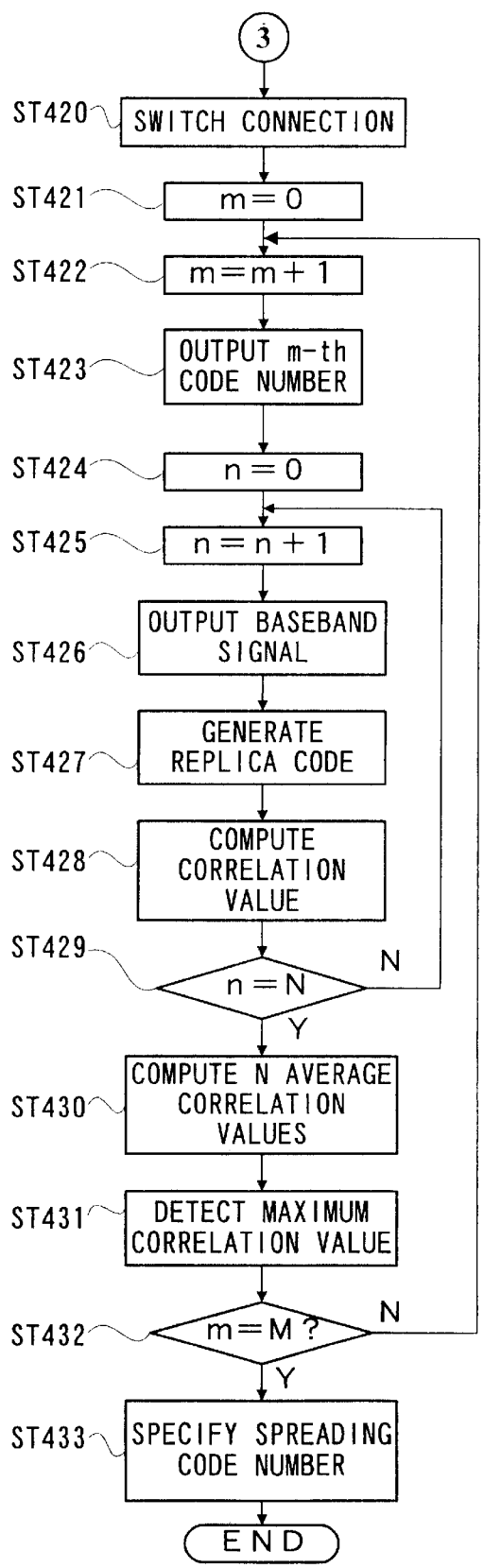
FIG. 6 is a flowchart showing a second half operation of the spreading code estimating apparatus according to the second embodiment of the present invention.
Figure 7:
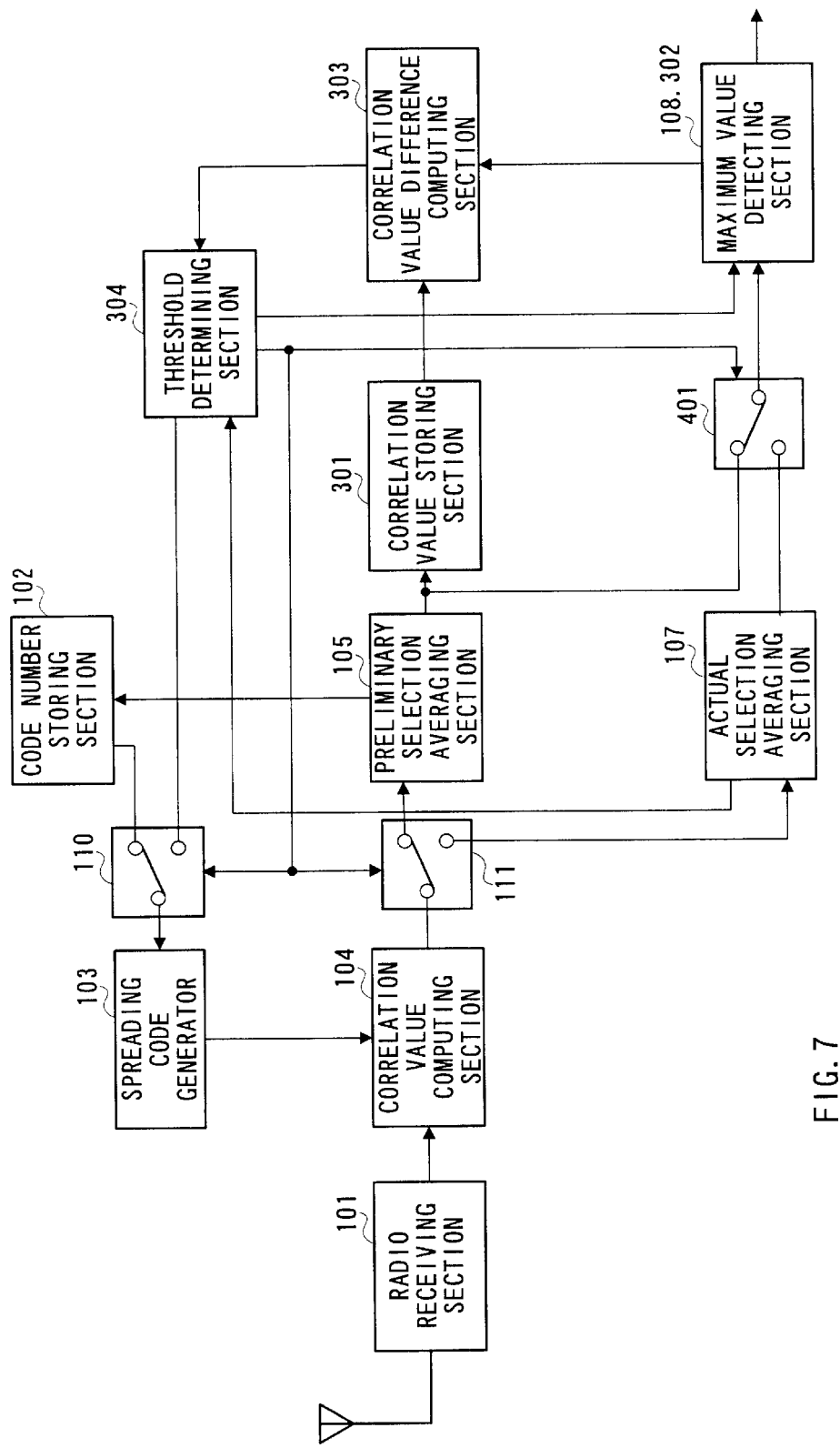
FIG. 7 is a block diagram showing the second structure of the spreading code estimating apparatus according to a second embodiment of the present invention.

In FIGS. 5 and 6, it should be noted that N is the noise restraint necessary number, and that L is the number of correlation values to be averaged at the time of the preliminary selection. In this case, L is smaller than the noise restraint necessary number. Also, I denotes the total number of spreading codes used in this system, and M means the number of spreading codes selected at the time of the preliminary selection.

First, in ST 401, as an initial setting, the moving contact of the switching section 110 is connected to the code number storing section 102, and the moving contact of the switching section 111 is connected to the preliminary selection averaging section 105.

In ST 402 to ST 404, the first code number is output to the spreading code generator 103 from the code number storing section 102.

In ST 405 to ST 410, the radio receiving section 101 outputs the baseband signal to the correlation value computing section 104 at a predetermined timing. Then, the spreading code generator 103 outputs the replica code to the correlation value computing section 104, and the correlation value is computed by the correlation value computing section 104.

In ST 411, L correlation values computed by the correlation value computing section 104 are input to the preliminary selection averaging section 105, so that L average correlation values are computed. Then, the computed average correlation values are output to the correlation value storing section 301 and the maximum value detecting section 302.

In ST 412 to ST414, the correlation value storing section 301 stores L average correlation values, and the maximum value detecting section 302 detects the maximum correlation value in the L average correlation values of all spreading codes.

In ST 415 to ST 419, the correlation value difference computing section 303 computes the correlation value difference between the L average correlation value of each of the spreading codes and the maximum correlation value. Then, the threshold determining section 304 preliminarily selects the spreading codes, having correlation value differences smaller than a predetermined threshold value, as the candidate codes, and their code numbers are stored.

After that, the preliminarily selected candidate codes are subjected to the actual selection in the steps set forth below.

First of all, in ST 420, the moving contact of the switching section 110 is connected to the threshold value determining section 304, and the moving contact of the switching section 111 is connected to the actual selection averaging section 107.

In ST 421 to ST 423, the code numbers stored in the threshold value determining section 304 are output to the spreading code generator 103 sequentially.

In ST 424 to ST 429, the radio receiving section 101 outputs the baseband signal to the correlation value computing section 104 at a predetermined timing. Then, the spreading code generator 103 outputs the replica code to the correlation value computing section 104, and the correlation value is computed by the correlation value computing section 104.

In ST 430, N correlation values are input to the actual averaging section 107. Then, the actual averaging section 107 computes an N average correlation value. The N average correlation value is one that is obtained by averaging the correlation values corresponding to the noise restraint necessary number. It can be expected that a sufficient difference will occur in the correlation value between the real spreading code and each of the other candidate codes.

In ST 431 to ST 433, the maximum value detecting section 108 detects the maximum value in the N average correlation values of all candidate codes, and the corresponding candidate code is estimated as the real spreading code.

Thus, the candidate code is selected from the correlation difference between the average correlation value of each spreading code and the maximum correlation value. This can eliminate the candidate codes having no possibility of the real spreading code, and can largely reduce the spreading code estimation time.

In the second embodiment, as shown in FIG, 7, even if the maximum value detecting section 302 of FIG. 4 and the maximum value detecting section 108 thereof are shared, and an average correlation value input source switching section 401 is provided, the same effect can be obtained.

In this case, the average correlation value input source switching section 401 may be set such that the average correlation value is input from the preliminary selection averaging section 105 at the preliminary selection time, and is input from the actual selection averaging section 107 at the actual selection time.

By the above structure, only one maximum value detecting section may be provided, so that the scale of the apparatus can be reduced.

As mentioned above, according to the present invention, the replica code as a candidate is selected by performing the averaging using the correlation values smaller than the number of correlation values necessary for sufficiently restraining noise. Then, the selected replica code is subjected to the averaging by use of the number of correlation values necessary for sufficiently restraining noise, whereby estimating the spreading code by which the signal is multiplied on the transmitter side. This can provide the spreading code estimating apparatus, which can largely reduce time for estimating the spreading code number without decreasing the probability of success of estimating the spreading code as compared with the conventional case, and can provide the spreading code estimating method.

This application is based on the Japanese Patent Application No. HEI10-030635 filed on Jan. 28, 1998, entire content of which is expressly incorporated by reference herein.

What is claimed is:

1. A spreading code estimating apparatus comprising:
    a correlation value computing system that computes a correlation value between a receiving signal and a replica code;
    a first averaging system that averages L correlation values for each replica code so as to compute a first correlation value;
    a preliminary selecting system that selects a replica code as a candidate based on said first correlation value,
    a second averaging system that averages N, where N>L, correlation values for each replica code selected in said preliminary selecting system so as to compute a second correlation value; and
    an actual selecting system that estimates a spreading code by which the receiving signal is multiplied based on said second correlation value.

2. The spreading code estimating apparatus according to claim 1, wherein said preliminary spreading code selecting system selects a predetermined number of spreading codes in order of decreasing the first correlation value.

3. The spreading code estimating apparatus according to claim 1, wherein said preliminary spreading code selecting system selects the spreading code having the first correlation value higher than a predetermined threshold value.

4. The spreading code estimating apparatus according to claim 1, wherein said preliminary spreading code selecting system includes a correlation value storing system that stores the first correlation value, a maximum value detecting system that detects a maximum value of the first correlation value, a correlation value difference computing system that obtains a correlation value difference between said maximum value and said first correlation value; and a threshold determining system that selects a spreading code corresponding to the correlation value having a correlation value difference smaller than a predetermined threshold value.

5. The spreading code estimating apparatus according to claim 4, further comprising a sharing detection system that shares said spreading code estimating system and maximum value detecting system, and a switching system that switches an input source of the correlation value to be input to said sharing detection system in accordance with said first correlation value averaging system and second correlation value averaging system.

6. A spreading code estimating method comprising:
   computing a correlation value between a receiving signal and each of all replica codes stored;
   computing a first correlation value by averaging L correlation values for each replica code;
   selecting a spreading code as a candidate based on said first correlation value;
   computing a correlation value between the receiving signal and the selected replica code;
   computing a second correlation value by averaging N, where N>L, correlation values for each selected replica code; and
   estimating a spreading code by which the receiving signal is multiplied based on said second correlation value.

7. The spreading code estimating method according to claim 6, wherein said replica code candidate selecting selects a predetermined number of spreading codes in order of decreasing the first correlation value.

8. The spreading code estimating method according to claim 6, wherein said replica code selecting selects the spreading code having the first correlation value higher than a predetermined threshold value.

9. The spreading code estimating method according to claim 6, wherein said replica code selecting including:
   storing the first correlation value;
   detecting a maximum value of the first correlation value;
   obtaining a correlation value difference between said maximum value and said first correlation value; and
   selecting a spreading code corresponding to the correlation value having a correlation value difference smaller than a predetermined threshold value.

10. A mobile station apparatus having a spreading code estimating apparatus, said spreading code estimating apparatus comprising:
    a correlation value computing system that computes a correlation value between a receiving signal and a replica code;
    a first averaging system that averages L correlation values for each replica code so as to compute a first correlation value;
    a preliminary selecting system that selects a replica code as a candidate based on said first correlation value;
    a second averaging system that averages N, where N>L, correlation values for each replica code selected in said preliminary selecting system so as to compute a second correlation value; and
    an actual selecting system that estimates a spreading code by which the receiving signal is multiplied based on said second correlation value.

11. A base station apparatus having a spreading code estimating apparatus, said spreading code estimating apparatus comprising:
    a correlation value computing system that computes a correlation value between a receiving signal and a replica code;
    a first averaging system that averages L correlation values for each replica code so as to compute a first correlation value;
    a preliminary selecting system that selects a replica code as a candidate based on said first correlation value;
    a second averaging system that averages N, where N>L, correlation values for each replica code selected in said preliminary selecting means so as to compute a second correlation value; and
    an actual selecting system that estimates a spreading code by which the receiving signal is multiplied based on said second correlation value.

* * * * *